350-169.   XR   3553469   SR

United States Patent

[11] 3,553,469

| [72] | Inventors | Theo Stutz<br>Bassersdorf;<br>Peter Glauser, Glattbrugg, Switzerland |
|---|---|---|
| [21] | Appl. No. | 707,739 |
| [22] | Filed | Feb. 23, 1968 |
| [45] | Patented | Jan. 5, 1971 |
| [73] | Assignee | Contraves AG<br>Zurich, Switzerland |
| [32] | Priority | Feb. 23, 1967 |
| [33] | | Switzerland |
| [31] | | No. 2689/67 |

[54] ARRANGEMENT FOR MEASURING ANGULAR ROTATION USING TWO MOIREE PATTERNS
8 Claims, 5 Drawing Figs.

[52] U.S. Cl.......................................... 250/237,
250/220, 250/231, 350/169
[51] Int. Cl........................................H01j 39/12,
G01b 11/26
[50] Field of Search............................ 250/237G,
231S.E., 236; 356/169, 150, 170

[56] References Cited
UNITED STATES PATENTS
2,877,356   3/1959   Iddings.......................... 250/233X

*Primary Examiner*—Robert Segal
*Assistant Examiner*—V. Lafranchi
*Attorney*—Michael S. Striker ABSTRACT: For measuring the angular rotation between a first and second member a disc having a ringlike grating is mounted on each member. The gratings are identical, but the centers are displaced from each other. Light shining through the superimposed gratings generates Moirée patterns which are received by two groups of photocells situated diametrically opposite one another. Each group generates polyphase currents whose magnitude varies in synchronism with the motion between the gratings. The two groups of currents are evaluated to yield an angle.

INVENTORS
THEO STUTZ
PETER GLAUSER

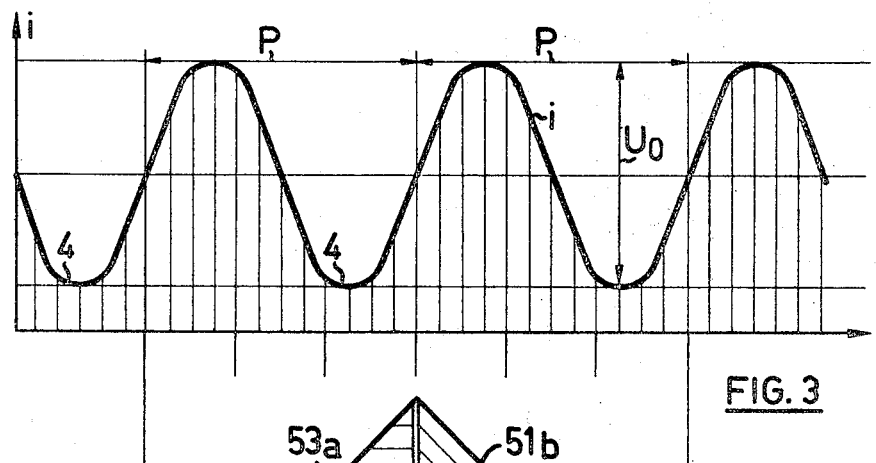
FIG. 3
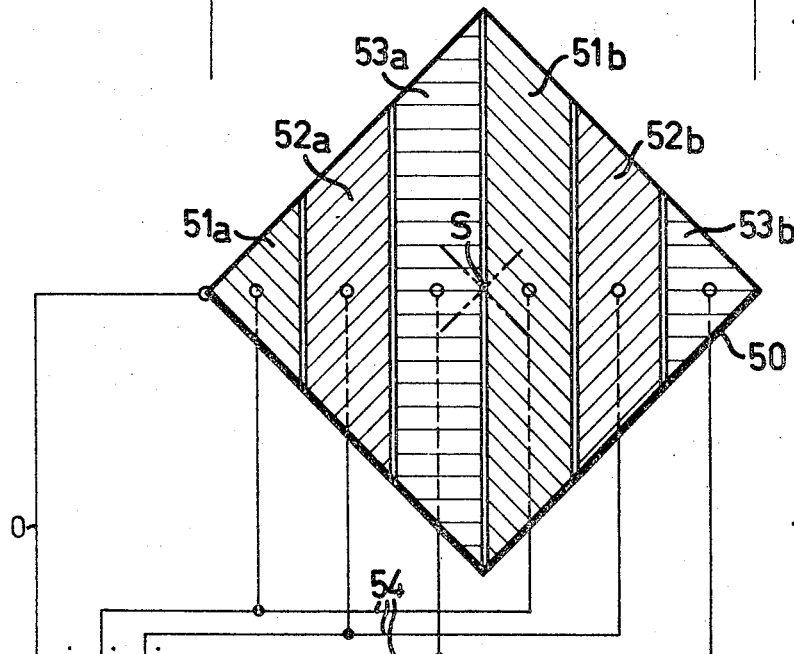
FIG. 4
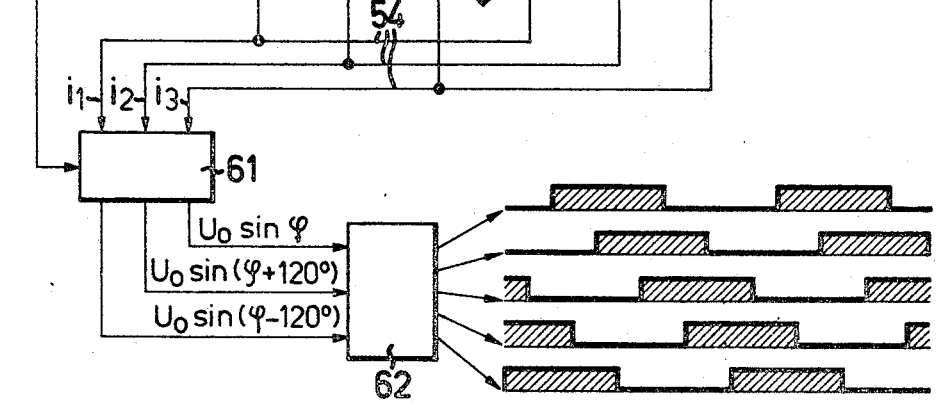
INVENTORS
THEO STUTZ
PETER GLAUSER

ARRANGEMENT FOR MEASURING ANGULAR ROTATION USING TWO MOIREE PATTERNS

BACKGROUND OF THE INVENTION

This invention relates to a photoelectric angle measuring arrangement, adapted to yield an electrical indication of the relative angular movement between a disc having a radial grating and readout means located at predetermined positions relative to said grating.

Conventional angle measurement arrangements of the above type have the following characteristics:

1. A second disc having a second grating which is different from the first grating either in grating constant or in orientation of the grating lines is mounted in a plane parallel to the first disc and at a short distance thereto. A light source shines light through the two superimposed gratings, thus generating Moiree patterns when relative motion between the two discs occurs.

2. The Moiree patterns consist of alternate light and dark bands, which move in a direction perpendicular to the direction of the length of the bands when relative motion between the two discs occurs. The luminance variation between the light and dark bands is substantially sinusoidal. This Moiree-patterned light is received by the photosensitive surfaces of two groups of photocells, located diametrically opposite one another.

3. Upon the above-mentioned impingement of said Moiree-patterned light, the photocells generate currents having a predetermined phase relationship to each other. Logic means are then furnished to evaluate and combine the currents from each group of photocells in such a manner as to furnish an indication, for example a count on a forwards-backwards counter, signifying the relative location of the two discs as it varies in time.

In conventional angle measuring arrangements of this kind three or four rectangular photocell surfaces are arranged next to each other and parallel to the bands of the Moiree patterns. The arrangement is such that together a complete light-to-dark period of the Moiree pattern is covered and that therefore a turning of one of the grating discs results in three or four varying photocell currents which are displaced relative to one another by equal phase angles (namely 90° if four surfaces are used or 120° if three surfaces are used). The assumption underlying the accurate operation of the above conventional angle indicating arrangements is that the sine or cosine alternating currents which are generated by the photocells do not change with respect to relative phase displacement or in respect to amplitude. This assumption is not warranted in practice for a number of reasons. For example, errors occur due to eccentricity of the discs and thermal expansion may result in motion which affects the different photocells in different ways. Therefore, the conventional angle measuring arrangements are only applicable in practice when a relatively low resolution is required, for example of the order of magnitude of 30 seconds. However, for a number of applications, as for example in phototheodolites, a digital resolution of the angle measurement into seconds or possibly even fractions of seconds is desirable. It is possible in the present state of the art to manufacture discs having ringlike gratings of a diameter of approximately 20 cm. and a grating constant such that divisions of 26 seconds result, which may, by interpolation of the output values of the two readout means, be divided into 40 increments of approximately 0.65 seconds each.

SUMMARY OF THE INVENTION

It is an object of this invention to furnish an arrangement for measuring the magnitude and direction of angular rotation between a first and a second member which comprises first disc means having a first ringlike grating symmetrically placed around a first center in a first plane mounted on said first member and second disc means having a second ringlike grating symmetrically placed around a second center in a second plane mounted on said second member, both gratings having the same grating constant and orientation, said first center being located a predetermined distance and direction from said second center, said first and second gratings being superimposed at at least one region. The arrangement further comprises illuminating means for shining light through said superimposed gratings, causing Moiree patterns to be generated upon relative motion of said first and second member. Readout means are supplied which receive said Moiree-patterned light and yield corresponding electrical signals. Finally, logic means are supplied for receiving said electrical signals and yielding angle measurement indications signifying the relative angular displacement between said first and second member.

The readout means may consist of a first and second group of photocells located in such a manner that each group receives the Moiree-patterned light from a first and second region of superimposed gratings respectively. Each of said groups of photocells preferably consists of a plurality of photocell strips arranged substantially parallel to each other in such a manner as to form a geometric figure. The individual strips, which are of equal width, are connected together in pairs to form individual photocells, in such a manner that the center of gravity of each individual photocell coincides with the center of gravity of the surface of the geometric figure and further that the moment of inertia of the individual photocells relative to two mutually perpendicular central axes are equal.

The above-mentioned relative location of the first and second centers of the disc means are so chosen that the diagonal of the above-mentioned geometric figure which is perpendicular to the direction of the Moiree bands is large enough to correspond to two periods of light-to-dark variation of the Moiree patterns.

The above-mentioned geometric figure may be a rectangle or square which is divided into six or eight equally wide, parallel strips in the direction of one diagonal, said strips extending in the direction of the other diagonal.

This form is applicable if the length of the diameter of the two grating rings relative to the dimension of the square is such, that the bands of the Moiree pattern may be considered parallel straight lines. Of course, actually the Moiree patterns consist of circular lines.

If it is necessary to take into consideration the curvature of the Moiree pattern bands, then a conformal mapping of the rectangle and the photostrips is required in order to transform the relationships from the Euclidean parallel geometry into the nonEuclidean circular geometry. Then the light distribution, which was assumed to be homogeneous for the case of parallel Moiree bands, becomes inhomogeneous. It then becomes necessary that the centers of gravity of the light and the moments of inertia of the light, rather than the surface centers of gravity and the surface moments of inertia, meet the above-mentioned requirements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a graphical representation of the luminance distribution between the light and dark bands of the Moiree patterns in the region of the readout means according to FIGS. 1 and 2;

FIG. 4 is an enlarged representation of the photocell surfaces of readout means according to FIGS. 1 and 2, with the logic means connected thereto.

DESCRIPTION OF THE PREFERRED EMBODIMENTS

Figure 1:
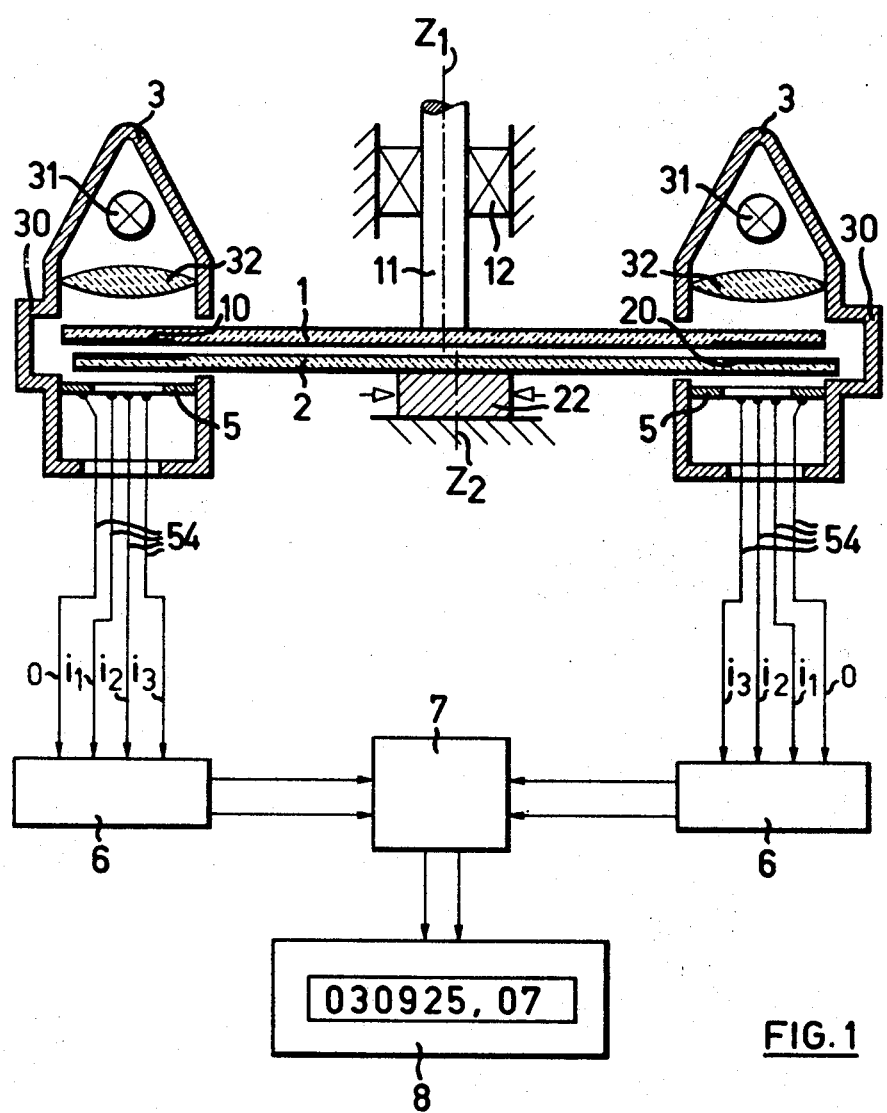
FIG. 1 is a semischematic representation of the angular rotation measurement arrangement, wherein the mechanical parts are represented in an axial section through both grating discs and through the readout means.
Figure 2:
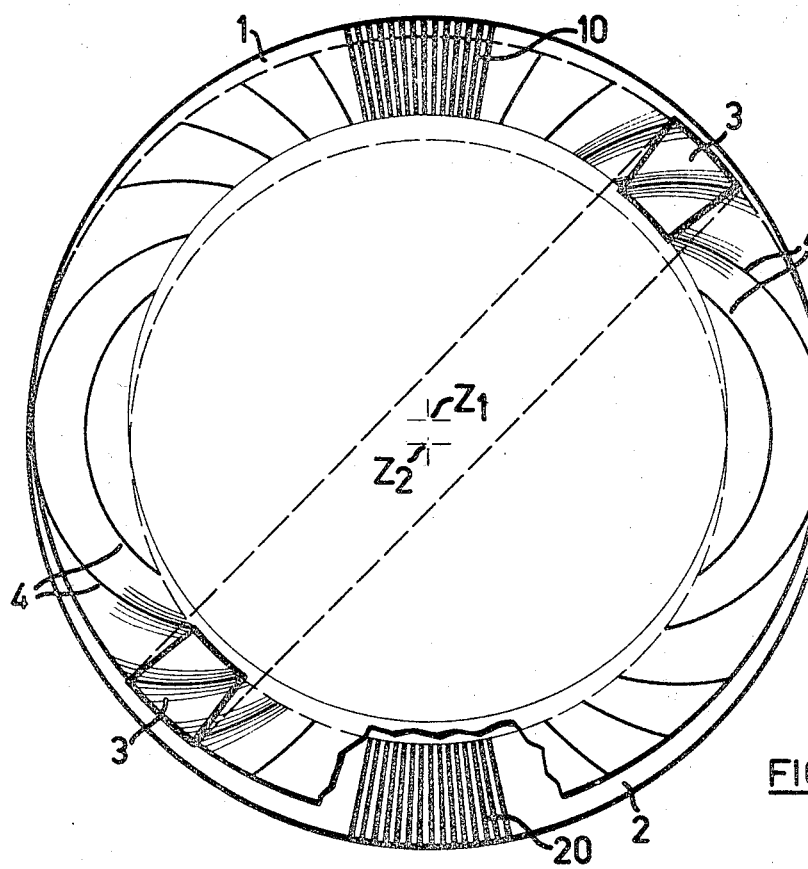
FIG. 2 is a simplified top view of the arrangement of FIG. 1.

In the arrangement according to FIGS. 1—4, the reference numeral 1 denotes first disc means, here a single disc having a grating 10 around its circumference, said grating consisting of radial, opaque lines, separated from each other by transparent areas of equal width. FIG. 2 shows only a short section of such a grating for illustrative purposes. For example, if the median diameter is approximately 20.5 cm. enough lines may be placed around the circumference to result in divisions of approximately 26 seconds. Disc 1 is mounted about a central shaft 11, (second member) which is mounted in bearing 12 for rotation about the axis. $Z_1$ denotes the exact center of the grating ring. This is unavoidably somewhat eccentric to the true axis of rotation of the disc 1. Second disc means, here a disc 2, which, as a minimum, has a grating constant equal to that of disc 1, and which is preferably completely identical to disc 1 is mounted in a fixed position underneath the photoelectric readout means 3, which is situated diametrically opposite one another. The disc 2 is mounted on a base 22 (first member) which is stationary during operation, but whose position may be continuously adjusted in two coordinate directions by means of adjustment screws. This is to allow adjustment of the location of the center $Z_2$ of the grating 20 of disc 2 relative to the center $Z_1$ of grating 10 of disc 1 for a predetermined distance and in a predetermined direction, as required for the generation of appropriate Moiree patterns. The Moiree patterns resulting when a homogeneous illumination is applied to the superimposed region of the gratings 10 and 20 of discs 1 and 2 respectively is shown in FIG. 2. This Moiree pattern consists of dark and light bands in circular form passing through the centers $Z_1$ and $Z_2$. The dark bands are designated with the numeral 4 in FIG. 2. The variation of the luminance between neighboring dark bands is shown in FIG. 3. It may be seen that it is approximately sinusoidal. The direction of the abscissa corresponds to a line perpendicular to adjacent Moiree bands, while the luminance values are plotted in the ordinate direction. Each luminance minimum corresponds to a dark band 4.

The readout means, here photoelectric readout means situated diametrically opposite one another, consists of a housing 30 each, preferably situated on a common base, and a lens arrangement 32 situated on top of the discs 1 and 2, while below discs 1 and 2 is a photocell surface 5 which may be a rectangle as shown in FIG. 4. As shown in FIG. 4, the photocell rectangle 5 of both of these readout means may each consist of six equally wide photocell strips whose length dimension runs parallel to a diagonal of said rectangle. Said photocell strips $51_a$, $52_a$, $53_a$, $51_b$, $52_b$, $53_b$ are electrically insulated from each other and together form a rectangle, which may, as shown here, be a square. The lengthwise direction of the strips is to correspond to the direction of the Moiree bands. The length of the diagonal perpendicular to the direction of the Moiree bands, and thus perpendicular to the photocell strips, must be equal to twice the length of a period P of the luminance variation in the Moiree pattern, that is twice as great as the distance between two adjacent dark bands 4. The proper Moiree pattern is achieved by the aforementioned adjustment of the location of the center $Z_2$ of the second disc with respect to the center $Z_1$ of the first disc.

The individual photocells are connected in pairs as follows: $51_a$ and $51_b$; $52_a$ and $52_b$; $53_a$ and $53_b$, to form individual photocells. Each of these individual photocells 51—53 is connected to logic means 60 by means of four conductor cables 54.

Upon relative motion of grating 1 to grating 2, alternating photocurrents $i_1$, $i_2$, and $i_3$ appear at the outputs of photocells 51—53. The frequency of these currents is proportional to the rotational velocity of the disc 1.

Reference to FIG. 4 shows that the center of gravity of the three individual photocells coincides with the center of gravity S of the rectangle, and that furthermore the moments of inertia of these photocells are equal with respect to the two central axes parallel to the sides of the square.

Because of the above symmetries, all measurements refer to the center of gravity S of the photocell rectangle, and the photocell currents $i_1$, $i_2$, and $i_3$ are displaced from one another by predetermined equal phase angles, (120° according to FIG. 4) and have equal amplitudes $U_0$. If the photocell rectangle were to consist of eight strips, four currents each having a 90°-phase displacement with respect to the other would result, while for 12 photostrips six currents having a 60°-phase displacement result.

Because of the above-explained symmetries, errors resulting from the eccentricity of the rotating disc 1, and other errors resulting from mechanical defects such as different thermal expansion of different parts of the arrangement, affect all photocells equally, that is, they affect neither the phase displacement nor the equality of amplitude. Localized errors resulting from the above-mentioned mechanical defects and in particular the eccentricity, are compensated for in known manner by combining the measured values generated by the two diametrically opposed readout means.

While the particular logic means used to evaluate the signals generated by the photocells do not form a part of this invention, a possible embodiment of these is shown in FIG. 4. Thus, the outputs of the two photocell groups 5 of the two readout means 3 are fed to a differential amplifier 61 in order to eliminate the common direct current components and to generate a pure alternating current system $U_o \cdot \sin(\phi+o)$, $U_o \cdot \sin(\phi+120°)$, $U_o \cdot \sin(\phi-120°)$, which in turn is fed to interpolating means 62, consisting for example of Scott circuits and polarity discriminators such as Schmitt triggers, thus causing the derivation of a corresponding polyphase binary signal system as shown in FIG. 4 at the output of interpolating means 62. In FIG. 1 it is assumed that the units with reference number 6 each comprise a differential amplifier 61, interpolating means 62, and logic circuitry to derive incremental signals with the proper sign in the form of two phase binary signal sequences. These incremental signals signify angular rotation of the disc 1 in units which correspond to fractions of the divisions in the gratings 10 and 20 respectively. In practice it is even possible to convert the two three-phase alternating current systems $i_1$, $i_2$, and $i_3$ into a 20-phase system having 18°-phase shifts and thus deriving signals for counting 2×10⁶ increments per rotation.

As shown in FIG. 1 these incremental signals may be counted on a counter 8.

Figure 5:
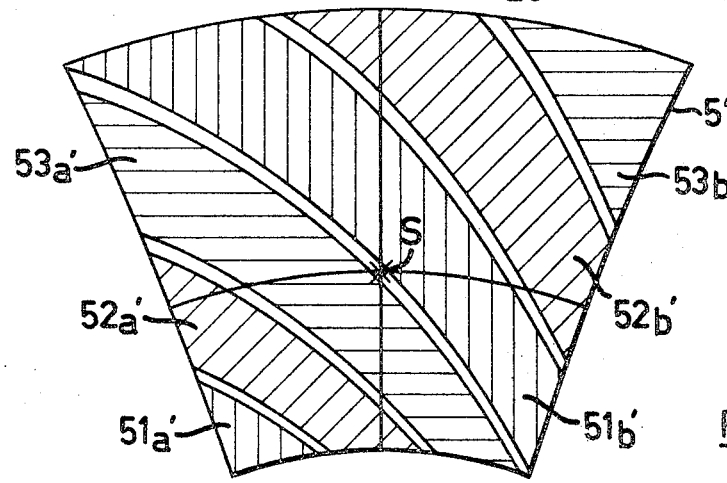
FIG. 5 is a nonEuclidean representation of the photocell square of FIG. 4, resulting from a conformal transformation.

FIG. 5 shows a conformal representation of the photocell square shown in FIG. 4. Here an inhomogeneous light distribution must be assumed to correspond to the homogeneous light distribution according to FIG. 4. The actual light falling on each photocell pair must be considered for the computation of the moments of inertia and center of gravity.

While the invention has been illustrated and described as embodied in a particular photocell arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Arrangement for measuring angular rotation between a first member and a second member, comprising, in combination, first disc means having a first grating symmetrically placed around a first center in a first plane and mounted on said first member; second disc means having a second grating symmetrically placed around a second center in a second plane and mounted on said second member, said second plane being parallel to said first plane and a short distance therefrom, said first and second gratings each comprising a plurality of opaque lines of predetermined width alternating with transparent lines, said first and second gratings having the same grating constant and orientation, said first center being located a determined distance and direction from said second center, said first and second gratings being superimposed in a first region and a second region diametrically opposite to said first region; first and second illuminating means for illuminating said superimposed gratings, thus causing Moiree patterns to be generated upon relative motion of said first and second members; first and second readout means mounted to receive said first and second sequence of Moiree patterns, respectively, said first and second readout means being adapted, respectively, to generate electrical signals as a function of received light; and means for receiving said electrical signals and yielding an angle measurement as a function thereof.

2. An arrangement as set forth in claim 1, wherein the width of said transparent lines is equal to the width of said opaque lines.

3. An arrangement as set forth in claim 1, wherein said first member is a stationary member and said second member is a rotating member.

4. An arrangement as set forth in claim 3, wherein said second member rotates, alternatively, in a forward and in a reverse direction.

5. An arrangement as set forth in claim 2, further comprising means for adjusting said determined distance and direction, said first center is located from said second center.

6. An arrangement as set forth in claim 5, wherein said first and second readout means, respectively, comprise a first and second group of photocells.

7. An arrangement as set forth in claim 6, wherein said first and second group of photocells each comprise at least three photocells, said first and second group of photocells thus furnishing, respectively, a first and second group of polyphase currents, the magnitude of said currents varying in synchronism with the relative motion between said first and second disc, the phase shift between current in said first group of currents being equal to the phase shift between current in said second group of currents.

8. An arrangement as set forth in claim 1, wherein said readout means comprise a first and second group of photocells, mounted in such a manner as to receive the light passing through said first and second superimposed grating regions respectively, each of said groups of photocells consisting of a plurality of photocell strips arranged substantially parallel to each other, each of said groups having a width measured in a direction substantially perpendicular to the direction of the length of said strips; and wherein the relative location of said first and second centers is such that the dark and light bands of the Moiree pattern extend in the same direction as the length of said photocell strips, and that the period of luminance change between adjacent bands corresponds to one-half the width of each of said groups.